Figure 6:
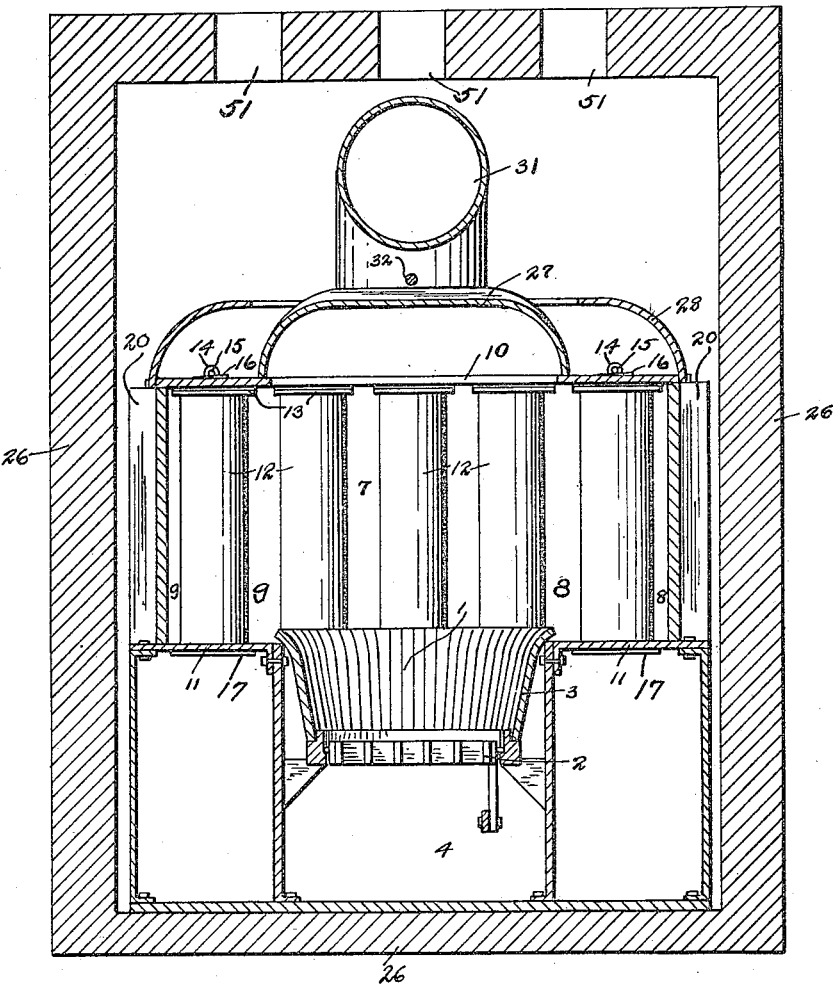

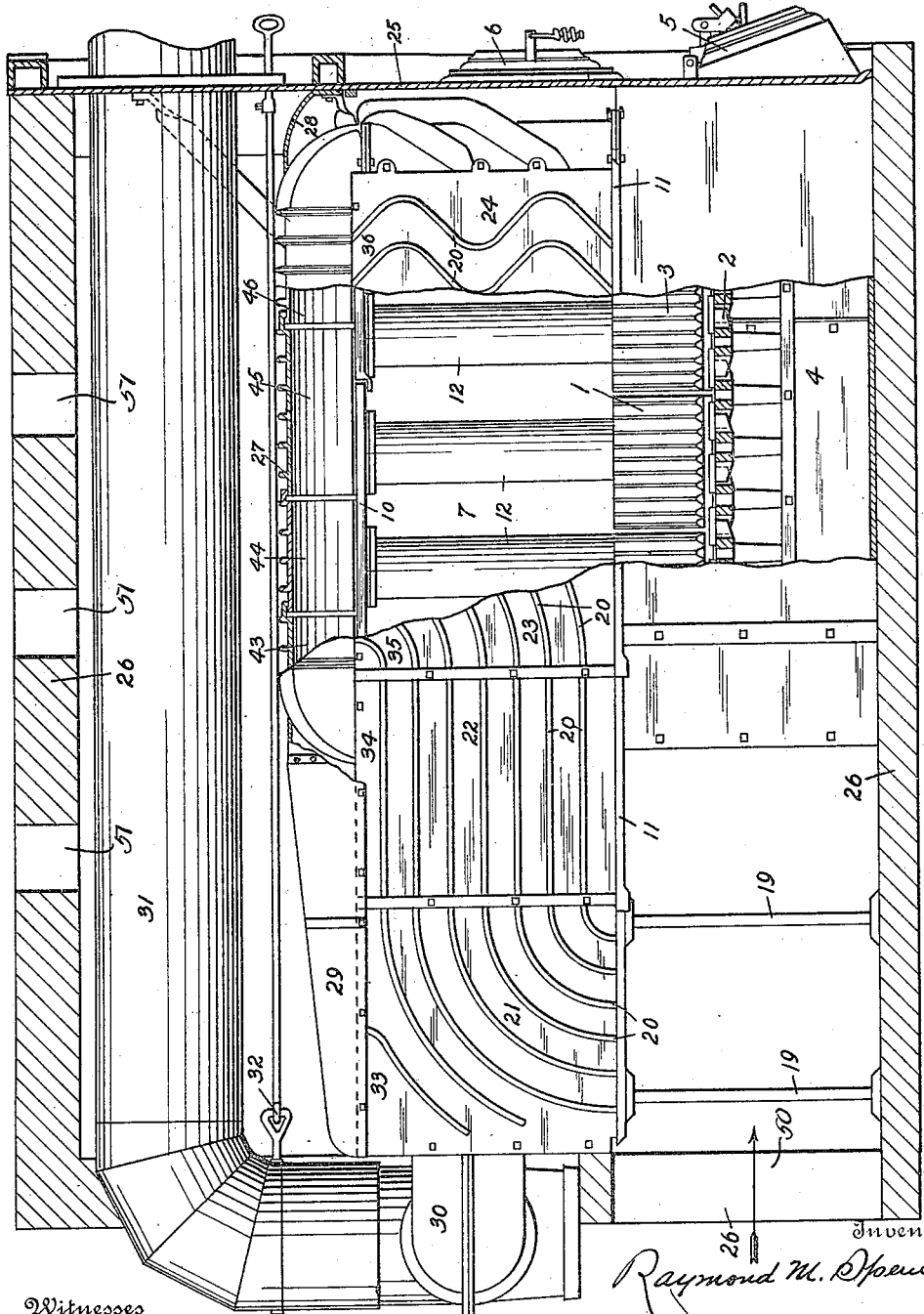

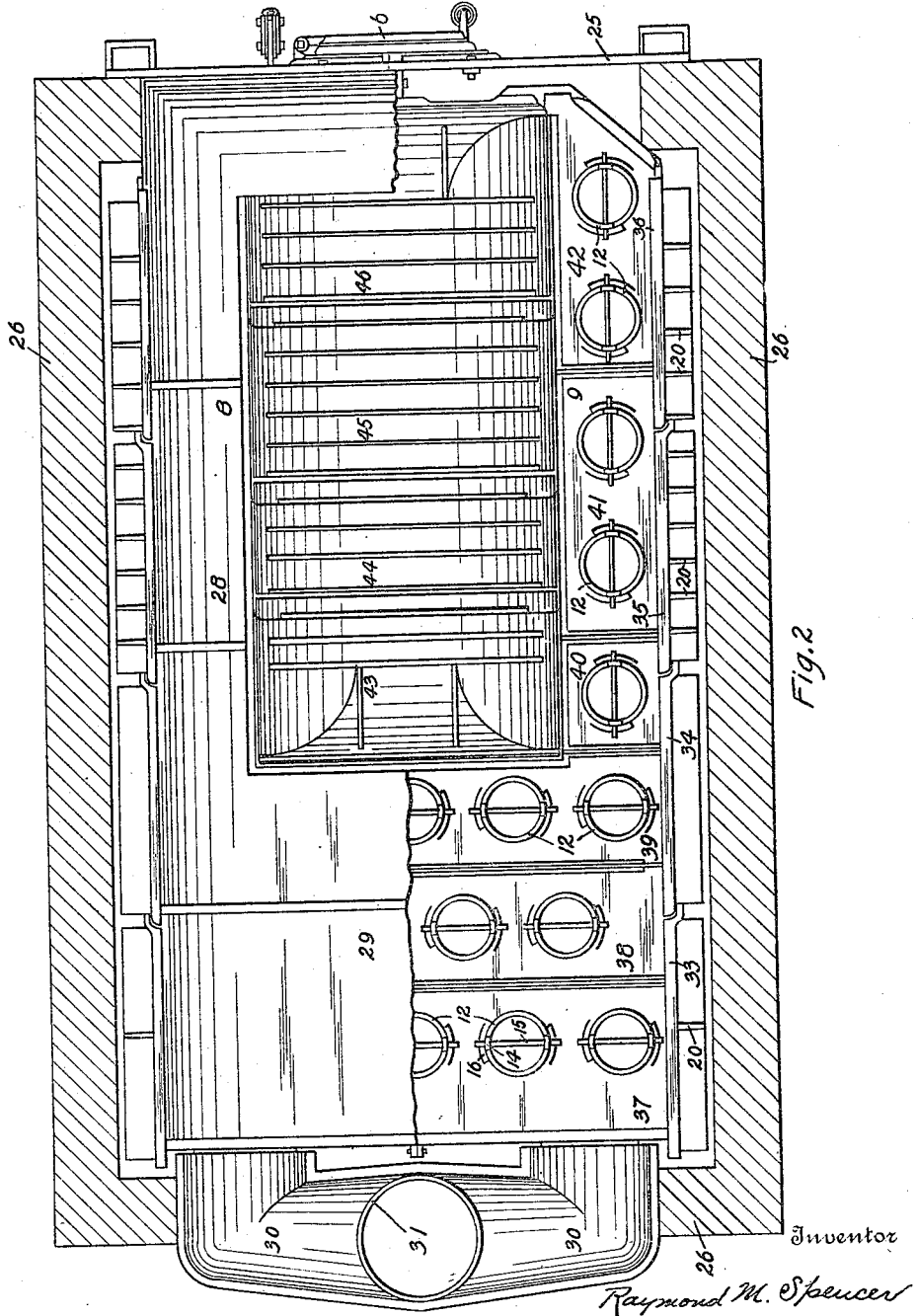

R. M. SPENCER.
FURNACE STRUCTURE.
APPLICATION FILED JAN. 23, 1913.
1,278,777.
Patented Sept. 10, 1918.
4 SHEETS—SHEET 3.
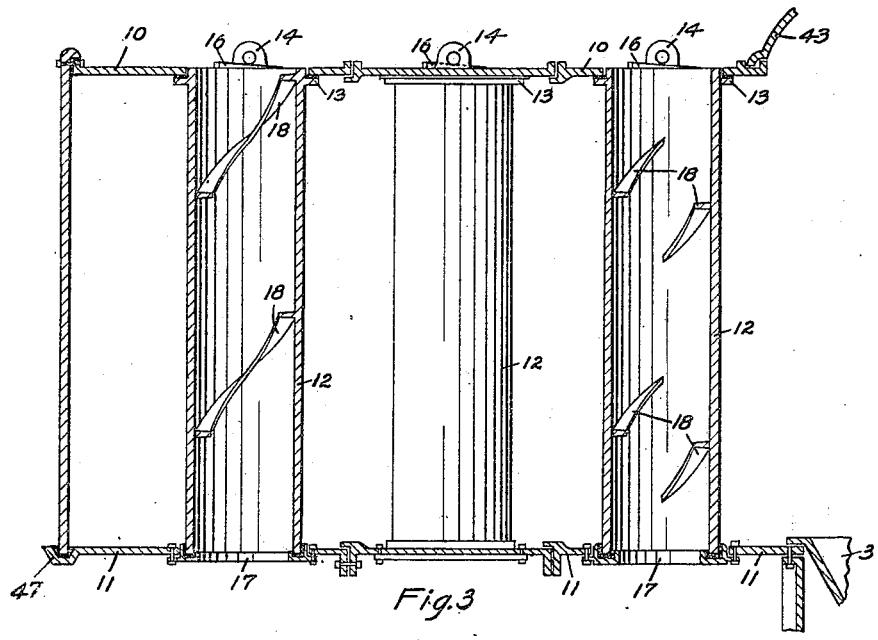
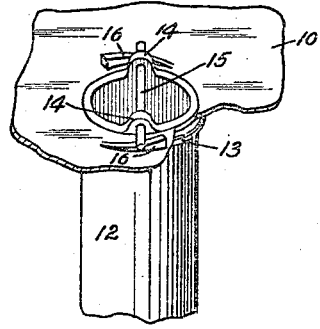
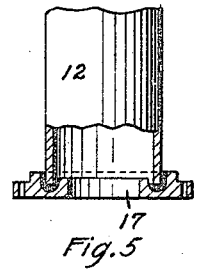
Inventor
Raymond M. Spencer
Witnesses
L. W. Frost
A. L. Phelps
By
C. C. Shepherd
Attorney

UNITED STATES PATENT OFFICE.

RAYMOND M. SPENCER, OF COLUMBUS, OHIO, ASSIGNOR TO THE COLUMBUS HEATING & VENTILATING COMPANY, OF COLUMBUS, OHIO, A CORPORATION OF OHIO.

FURNACE STRUCTURE.

1,278,777.   Specification of Letters Patent.   Patented Sept. 10, 1918.

Application filed January 23, 1913. Serial No. 743,721.

*To all whom it may concern:*

Be it known that I, RAYMOND M. SPENCER, a citizen of the United States, residing at Columbus, in the county of Franklin and State of Ohio, have invented certain new and useful Improvements in Furnace Structures, of which the following is a specification.

My invention relates to furnace structures and is particularly directed as an improvement in heating furnaces shown and described in Letters Patent #654,719, dated July 31, 1900. I aim particularly to provide an improved construction of hot air furnace wherein all of the incoming air is subject to a uniform heating as nearly as is possible and in carrying this out, I provide a construction wherein the air to be heated is directed over all the available heating surfaces and in my preferred construction, wherein the combustion chamber extends rearwardly from the fuel chamber, I provide the vertical combustion chamber walls with outwardly extending flanges from the passageways for the air to be heated, these passageways gradually increasing in length from the hottest portion of the furnace to the coolest portion and always directing the air to be heated over that portion of the structure which is the hottest.

A further important feature of my invention resides in the combination of a plurality of tubes passing through the furnace structure with a hood structure so formed and arranged as to direct all the air passing through the tubes to a point over the hottest portion of the combustion chamber where it is permitted to commingle with the remaining air confined in the surrounding casing.

The preferred embodiment of my invention is shown in the accompanying drawings, in which similar characters of reference designate corresponding parts, and in which:

Figure 1 is a partial side elevation and partial section of my improved furnace structure, Fig. 2 is a plan view of the structure shown in Fig. 1, with a portion of the air deflecting structure broken away, Fig. 3 is a section taken through a portion of the combustion chamber, Fig. 4 is a view in perspective of one of the air heating tubes illustrating the method of attachment to the combustion chamber, Fig. 5 is a side elevation partially in section of the bottom portion of one of these tubes, and Fig. 6 is a vertical transverse section taken through the fuel chamber portion of my furnace.

In the drawings, the fuel chamber is shown at 1, as comprising the usual grate bar construction 2 and side wall construction 3, of any preferred construction and having an ash pit 4 below the grate bars, entrance to which may be had through the usual ash door construction 5, and entrance to the fuel chamber proper may be had through the fire door 6. Extending rearwardly from the fuel chamber 1 and above the level of the grate bars 2 is the main combustion chamber 7, which also extends longitudinally along each side of the fire box, as shown at 8 and 9. The upper and lower walls 10 and 11 of the combustion chamber are apertured as desired for the reception of air conducting heating tubes 12 arranged in any desired number and preferably arranged in staggered relation, as more clearly shown in Fig. 2. These conducting air heating tubes are constructed with a shoulder 13 adjacent their upper ends, which shoulder is adapted to abut the upper plate 10, a small continuation of the tube extending through the top plate and being provided with upwardly extending ears 14 apertured for the reception of a locking rod 15. The upper plate 10 is also provided with inclined concentric cam trackways 16. The lower plate 11 is also apertured and is provided with concentric channel structures 17 for the reception of the lower portion of the heating tubes. In mounting, the channel construction 17 is lined with asbestos or some similar material and the tubes 12 placed in position, whereupon the top plate 10 is mounted to rest upon the shoulders 13 of the tubes 12 and the rods 15 passed through the apertures in the upwardly extending ears 14. By the use of a pipe wrench and twisting these tubes, the ends of the rods 15 are brought into engagement with the inclined cam trackways 16 and in this manner the tubes are securely held in locked position upon the top plate 10. All of the tubes 12 are also provided with a series of spiral baffles 18, each preferably extending through half the inner periphery of the tubes. By the provision of these baffles, the air entering is thoroughly mixed by being given a rotary motion due to the spiral arrangement of the baffles, this rotary upward movement then being interrupted by an open space before encountering the next baffle.

The combustion chamber 7 is preferably supported at one end upon the rear wall of the fuel chamber and supported at its rear by the provision of a plurality of upwardly extending standards 19. The side walls of the combustion chamber are also peferably provided with a series of upwardly extending flanges 20 being arcuate at the rear of the furnace as shown at 21, being horizontally disposed as at 22 and again being arcuate as shown at 23. At the extreme forward end of the furnace and adjacent the fire box, the flanges are of an upwardly extending zigzag nature as shown at 24. The entire furnace structure is suitably inclosed within a setting shown as comprising a front cast iron wall 25 and a surrounding and covering masonry structure 26 and this masonry structure is provided with a cold air inlet 50 and hot air outlets 51. The vertical walls of the masonry structure 26 are preferably spaced from the outer extremities of the flanges 20 just a sufficient distance to allow of dismantling and withdrawing of the side sections of the furnace proper. It will, therefore, be noted that the flanges 20 all form passageways for the incoming air to be heated and that these passageways successively increase in length from what is conceded to be the hottest portion of the furnace adjacent the fire box, to the coolest portion of the furnace. It will also be noted that all these passageways direct the incoming air to a point over the crown 27 of the fuel chamber or fire box 1. That portion of both the combustion and fuel chambers through which the tubes 12 pass is covered with a hood or deflecting plate structure as shown particularly in Figs. 1, 2 and 6. That portion which extends from the rear of the combustion chamber forwardly to a point adjacent the crown 27 has been designated 29 and that portion lying adjacent the front of the fuel chamber and also that portion lying over the tubes 12 and which is located longitudinally of the fuel chamber and extends inwardly and upwardly has been designated 28. Thus, all of the air which passes through the tubes 12 is directed to a point over the crown 27 to cause its thorough commingling and likewise the air entering through the passageways formed by the curved flanges 20 as shown at 21 is gradually led forward to a point adjacent the fuel chamber and is discharged so that it commingles with the air passing through the spaces formed by the zigzag flanges 20 and is discharged to commingle with the air directly over the fuel chamber. In this manner, it has been aimed to uniformly heat all of the incoming air and to be assured of this, this incoming air is all directed to a point adjacent the top of the fuel chamber so that it will be thoroughly mixed before being withdrawn through the hot air outlets 51. The combustion chamber is also provided with a smoke outlet 30 leading to a smoke pipe 31, under the control of the damper structure shown at 32.

Both side walls of the combustion chamber are shown as formed of sections 33, 34, 35 and 36, all of which sections are equal in width. The upper wall of the combustion chamber is made of sections 37, 38, 39 and 40 all of a width equal to half the width of the side wall sections and is completed by sections 41 and 42 of a width equaling the side wall sections. The crown 27 is also formed of sections 43 and 44 equaling the width of sections similar to 40 of the upper wall of the combustion chamber and is completed by sections 45 and 46 of a width equaling the width of the sections 41 and 42 or the side wall section. It will be understood that the grate bars and their complemental structures are also similarly formed to the crown pieces. The air deflecting plates 28 and 29 are similarly formed in sections of corresponding width. Thus, if it is desired to decrease the capacity of the furnace, the side sections 34 may be removed, the upper and lower plates 38 and 39 and the entire rear portion of the combustion chamber moved forward. It will be noted that all the flanges 20 will coincide to form continuous passages. Similarly, if it is desired to increase the capacity, the side sections 34 and the upper and lower sections 38 and 39 may be duplicated and inserted in their respective positions. If, in the course of construction, it is desired to decrease the volume of the fuel chamber, this may be done by the removal of such sections 43 and 44 or section 45 and their complemental structure. It will, therefore, be noted that such sections as 38, 39 and 40 have a width dimension that is commensurate with the remaining width dimensions of the other sections of the furnace. These sections are all bolted together, as indicated, to form one unitary structure when assembled.

The remaining feature of importance of this invention is the manner of supporting the superstructure of the combustion chamber 7 upon its base plate. All of the sections forming this base plate are provided with channel formations about its perimeter, as shown at 47 in Fig. 3. The bottom plate 11 is mounted upon the fuel chamber and the supporting standards 19 as desired and a layer of asbestos placed within these inclined channel formations. The superstructure being designed to fit these channel formations, is then placed in its position and held against lateral movement sidewise, by the upwardly extending walls of the channels 47. It will be noted, that this construction, taken in connection with the method of mounting the air conducting pipes, allows for expansion or contraction in practically any degree or in any direction. The side plates of the fuel chamber are held in unrestrained extensible movement upward by eliminating all bolted joints about their connection with the base plate 11. The air tubes 12 are allowed a similar movement by a similar connection with the base plate 11. Inasmuch as extensible movement in a rearward direction would be approximately the same in the side plates as in the upper and lower plates, structure especially designed for this movement is not necessary, since any slight variation would be compensated for by the compressibility of the asbestos layer. It will thus be noted that I have provided a comparatively simple structure for accomplishing the objects of my invention.

What I claim, is:

1. A furnace comprising a fuel chamber, a rearwardly extending combustion chamber, a plurality of outwardly extending flanges on said combustion chamber, said flanges being shaped to form upwardly directed air passages at the rear of said combustion chamber, then horizontal passages and then upwardly directed passages at the front end of the combustion chamber to direct the air from the rear of the combustion chamber to a point over said fuel chamber, and an inclosing casing structure.

2. A furnace comprising a fuel chamber, a rearwardly extending combustion chamber, a plurality of outwardly extending flanges on said combustion chamber, said flanges being arcuately shaped at the front and rear ends of said combustion chamber and being horizontally disposed intermediate the front and rear ends to thereby form passages to direct the air from the rear of the combustion chamber to a point over said fuel chamber, and an inclosing casing structure.

3. A furnace comprising a fuel chamber, a rearwardly extending combustion chamber, both of said chambers being provided with outwardly extending flanges forming passages for the incoming air, said passages gradually increasing in length from the front of the fuel chamber to the rear of the combustion chamber and all formed to direct the air directly over the top of the fuel chamber, and an inclosing casing structure.

4. A furnace comprising a fuel chamber, a rearwardly extending combustion chamber, a plurality of tubes passing through said combustion chamber, a deflecting hood extending from the rear of said combustion chamber forward to direct all of the incoming air through said tubes over the top of said fuel chamber, said hood being open over said fuel chamber, and an inclosing casing structure.

5. A furnace comprising a fuel chamber, a rearwardly extending combustion chamber, a plurality of tubes passing through said combustion chamber, a deflecting hood extending from the rear of said combustion chamber forward to direct all of the incoming air through said tubes over the top of said fuel chamber, said hood being open over said fuel chamber, both of said chambers being provided with outwardly extending flanges forming passages for the incoming air independent of the air passing through said tubes, said passages gradually increasing in length from the front of said fuel chamber to the rear of said combustion chamber and all formed to direct the air over the top of said fuel chamber, and an inclosing casing structure.

6. A furnace comprising a fuel chamber, a rearwardly extending combustion chamber, a plurality of tubes passing through said combustion chamber, a plurality of tubes passing through said fuel chamber along the sides of its fire box, a deflecting hood covering all of said tubes and extending upwardly and inwardly to a point to direct all of the incoming air passing through said tubes into contact with the top of said fuel chamber, said hood being open over said fuel chamber, both of said chambers being provided with outwardly extending flanges forming passages for the incoming air independent of the air passing through said tubes, said passages gradually increasing in length from the front of said fuel chamber to the rear of the combustion chamber and all formed to direct the air over the top of the fuel chamber, and an inclosing casing structure.

In testimony whereof I affix my signature in presence of two witnesses.

RAYMOND M. SPENCER.

Witnesses:
WALTER E. L. BOCK,
A. L. PHELPS.

Copies of this patent may be obtained for five cents each, by addressing the "Commissioner of Patents, Washington, D. C."